United States Patent [19]

Suzuki

[11] Patent Number: 4,794,903
[45] Date of Patent: Jan. 3, 1989

[54] RECIRCULATED EXHAUST GAS QUANTITY CONTROL APPARATUS FOR INTERNAL COMBUSTION ENGINE

[75] Inventor: Hiroyoshi Suzuki, Himeji, Japan

[73] Assignee: Mitsubishi Denki Kabushiki Kaisha, Tokyo, Japan

[21] Appl. No.: 6,926

[22] Filed: Jan. 27, 1987

[30] Foreign Application Priority Data

Feb. 14, 1986 [JP] Japan .................................. 61-31315

[51] Int. Cl.$^4$ ........................................... F02M 25/06
[52] U.S. Cl. ..................................... 123/571; 123/479
[58] Field of Search ................... 123/571, 479; 60/278

[56] References Cited

U.S. PATENT DOCUMENTS

| | | |
|---|---|---|
| 3,925,989 | 12/1975 | Pustelnik ............................ 123/571 |
| 4,005,689 | 2/1977 | Barnard . | |
| 4,168,683 | 9/1979 | Hata et al. . | |
| 4,375,800 | 3/1983 | Otsuka ................................. 123/571 |
| 4,433,666 | 2/1984 | Masaki ................................ 123/571 |
| 4,541,398 | 9/1985 | Kishi ................................... 123/571 |
| 4,614,175 | 9/1986 | Asayama ............................. 123/571 |

Primary Examiner—Douglas Hart
Attorney, Agent, or Firm—Burns, Doane, Swecker & Mathis

[57] ABSTRACT

The recirculated exhaust gas quantity control apparatus of the present invention is provided with an oxygen sensor at the down stream side of the opening of the exhaust gas recirculating passage to an air intake passage. By detecting the oxygen concentration of mixture gas containing fresh air and exhaust gas being fed to the internal combustion engine, the control apparatus of the present invention constantly checks whether the abnormal condition of the recirculated exhaust gas quantity, in other words, the control apparatus itself, occurs or not.

2 Claims, 5 Drawing Sheets

RECIRCULATED EXHAUST GAS QUANTITY CONTROL APPARATUS FOR INTERNAL COMBUSTION ENGINE

BACKGROUND OF THE INVENTION

1. Field of the Invention

The present invention relates to a recirculated exhaust gas quantity control apparatus for an internal combustion engine.

2. Description of the Prior Art

In order to prevent atmospheric pollution, any of conventional internal combustion engines, in particular, any of those internal combustion engines of modern automobiles, minimizes dischargeable pollutants by recombustion of exhaust gas by recirculating it to the engine combustion chambers.

FIG. 1 is the schematic diagram of a recirculated exhaust gas quantity control apparatus developed in pursuit of the above object, which is disclosed in the Japanese Patent Laid-Open No. 55-93950(1980).

In FIG. 1, reference numeral 1 designates an internal combustion engine, 2 and 3 designate an air inlet manifold and an exhaust manifold which are respectively connected to an air inlet port and an exhaust outlet port of the engine 1, 4 designates a fuel supply device provided at the air inlet manifold 2, 5 designates a throttle for controlling the intake air quantity, 6 designates an air inlet duct, 7 designates an air-cleaner, 8 designates an engine revolution detector for detecting the number of the revolutions of the engine 1, 9 designates a boost lead passage, and 10 designates an engine boost detector for detecting the pressure of the air inlet manifold 2 via the boost lead passage 9. And reference numeral 11 designates an exhaust gas recirculating (hereinafter called EGR) passage which is connected to the air inlet manifold 2 and the exhaust gas manifold 3, 12 designates an EGR control valve set to the EGR passage 11, 13 designates a detector for detecting opening of the EGR valve 12, 14 designates an EGR control circuit, 15 designates an atmospheric pressure lead passage, and 16 designates a control-negative pressure generator for controlling the opening of the EGR valve 12. The control-negative pressure generator 16 is so constructed that negative pressure is generated by using the engine boost pressure in the boost lead passage 9 and atmospheric pressure in the atmospheric pressure lead passage 15, while control negative pressure is generated by adjusting the above negative pressure in response to the signal output from the EGR control circuit 14.

This apparatus having the constitution mentioned above provides the following functional operations. First, fresh air sucked in through the air-cleaner 7 and the throttle 5 is mixed together with fuel fed from the fuel supply device 4 before being delivered to the engine 1 for combustion. Exhaust gas generated by combustion is discharged outside via the exhaust manifold 3, while part of which is recirculated to the air inlet manifold 2 via the EGR passage 11, which is then mixed together with sucked fresh air before being delivered to the engine 1 again.

This control apparatus can reduce harmful ingredients in exhaust gas by making part of exhaust gas recirculate to the air inlet side. However, the EGR quantity should adequately be controlled in accordance with the operative condition of the engine 1. To achieve this, this control apparatus comprises the EGR control valve 12 inside of the EGR passage 11 so that the EGR control valve 12 can properly be opened and closed in response to the operative condition of the engine 1. More particularly, the control apparatus detects the number of revolutions of the engine 1 using the revolution detector 8, and simultaneously, it also detects pressure inside of the air inlet manifold 2 using the engine boost detector 10, thereafter feeds the detected values to the EGR control circuit 14. The EGR control circuit 14 then compares the value of the opening detector 13 for the EGR control valve against the optimum aimed EGR rate preliminarily stored in memory in accordance with the quantity of condition of the engine 1 to the value actually output from the opening detector 13 for the EGR control valve and then generates an output signal in order that the deviation can be reduced to zero. Then, on receipt of this output signal, the control-negative pressure generator 16 generates a predetermined control-negative pressure to drive the EGR control valve 12 before achieving an optimum EGR quantity of recirculated exhaust gas matches the operative condition of the engine 1.

Nevertheless, any of those conventional EGR control apparatus having the constitution mentioned above causes a large amount of carbon and the like to be generated from exhaust gas, which easily adheres to the EGR control valve 12. Actually, when carbon adheres to the EGR control valve 12, compared to the initial value, the recirculated exhaust gas quantity significantly decreases even when retaining the identical valve opening, thus resulting in the lowered efficiency of exhaust gas purification, and yet, the car driver cannot easily notice this adverse condition.

Conversely, as the EGR control valve 12 wears itself, more recirculated exhaust gas quantity may be generated than the initial quantity even when retaining the identical valve opening. Like the former case, the car driver cannot easily detect the presence of this abnormal condition. As described above, normally, worsened EGR control characteristic caused by any of the conventional EGR quantity control system cannot easily be detected until the car driver actually senses abnormal performances of the engine itself.

SUMMARY OF THE INVENTION

The primary object of the present invention is to overcome those problems mentioned above by providing a novel recirculated exhaust gas quantity control apparatus of an internal combustion engine, which securely warns the car driver of abnormal condition present in the recirculated exhaust gas quantity control apparatus in the case that the exhaust gas recirculating rate deviates from the predetermined optimum range due to wear and/or clogging symptom present in the EGR control value.

The recirculated exhaust gas quantity control apparatus for an internal combustion engine of the present invention is provided with an oxygen sensor installed between the exhaust gas recirculating passage and the engine, means for detecting abnormal condition wherein it generates a predetermined output signal in the case that the output from the oxygen sensor deviates from the allowable output range, and alarm generating means for warning the car driver of the presence of abnormal condition of the recirculated exhaust gas quantity control apparatus on receipt of the signal output from above means.

The above and further objects and features of the invention will more fully be apparent from the following detailed description with accompanying drawings.

DESCRIPTION OF THE PREFERRED EMBODIMENTS

Referring now more particularly to the accompanying drawings, preferred embodiments of the present invention are described below.

Figure 1:
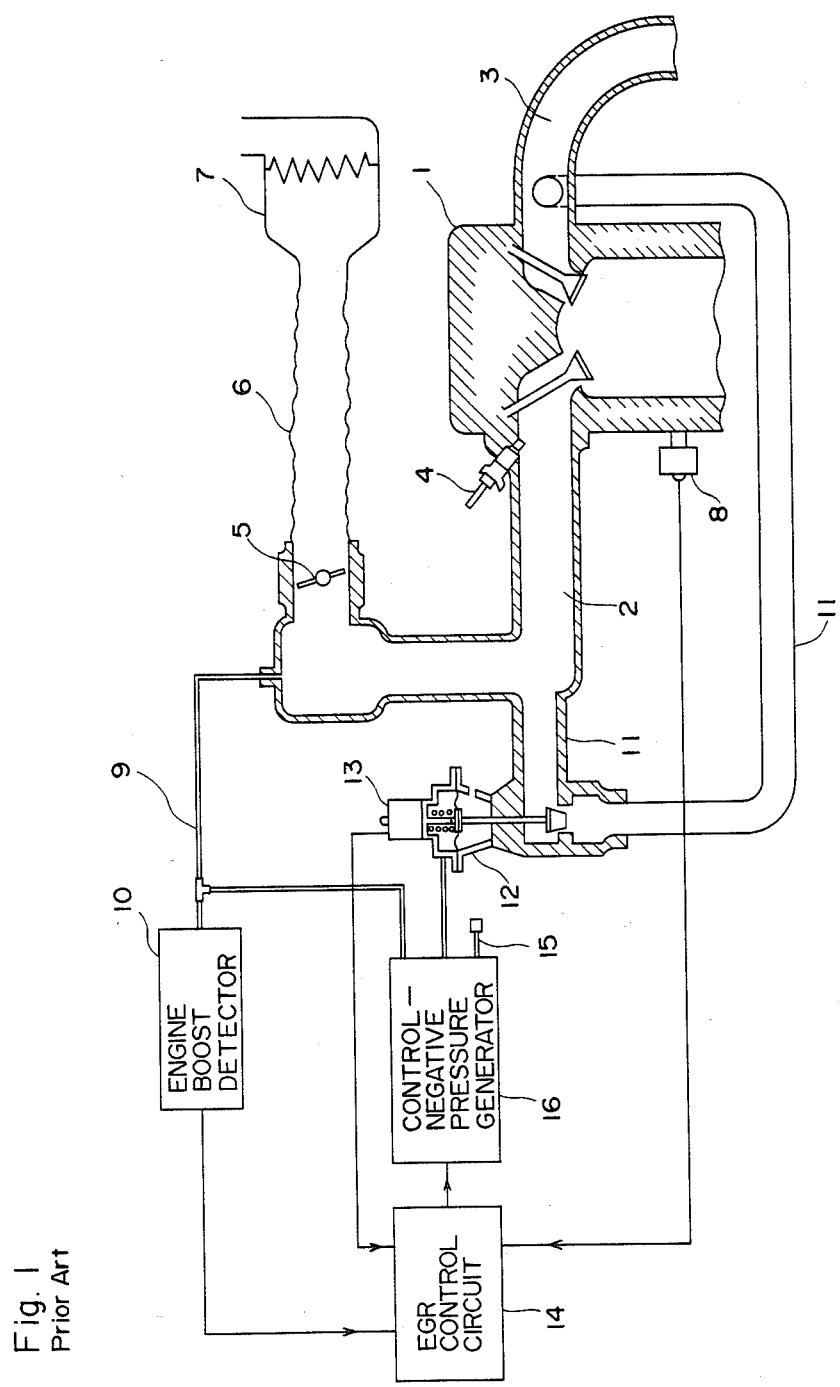
FIG. 1 is the schematic diagram showing the constitution of one of the conventional recirculated exhaust gas quantity control apparatus.
Figure 2:
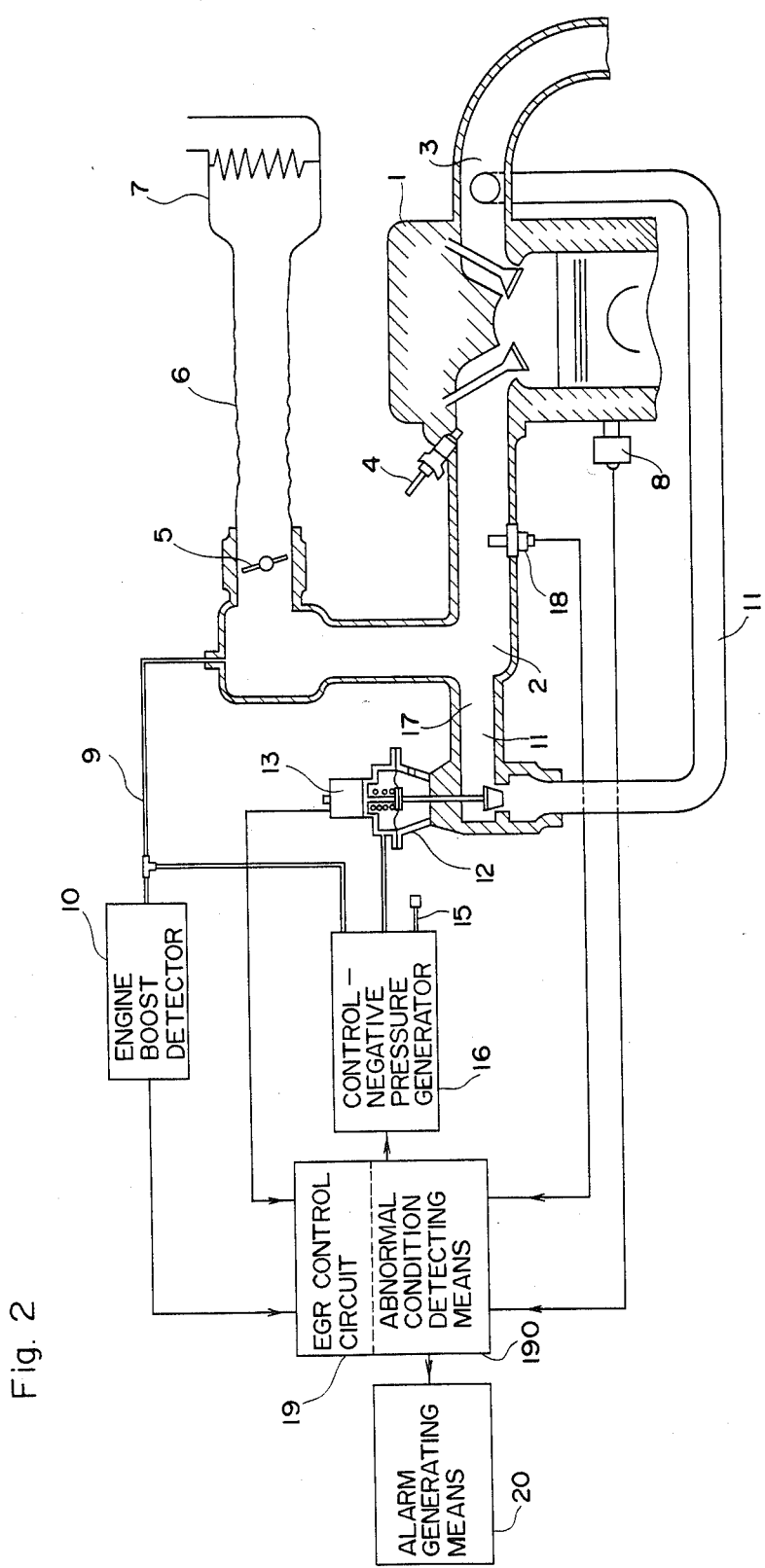
FIG. 2 is the schematic diagram showing the constitution of one of the preferred embodiments of the recirculated exhaust gas quantity control apparatus of the present invention.

FIG. 2 is the schematic diagram showing the construction of one of the preferred embodiments of the recirculated exhaust gas quantity control apparatus of the present invention. Those component parts corresponding to those of the prior art shown in FIG. 1 are respectively designated by identical reference numerals.

The recirculated exhaust gas quantity control apparatus of the present invention shown in FIG. 2 with an internal combustion engine. In FIG. 2, reference numeral 1 designates an internal combustion engine, 2 designates an air inlet manifold, and 3 designates an exhaust outlet manifold which are respectively connected to the air inlet port and the exhaust outlet port of the engine 1, 4 designates a fuel supply device provided at the air inlet manifold 2, 5 designates a throttle valve for controlling the sucked fresh air quantity, 6 designates an air-inlet duct, 7 designates an air cleaner, 8 designates an engine revolution detector for detecting the number of the revolutions of the engine 1, 9 designates a boost lead passage, 10 designates an engine boost detector for detecting the pressure of the air inlet manifold 2 via the boost lead passage 9, 11 designates an exhaust gas recirculating (hereinafter called EGR) passage being connected to the air inlet manifold 2 and the exhaust gas outlet manifold 3, 12 designates an EGR control valve set to the EGR passage 11, 13 designates a detector for detecting opening of the EGR control valve 12, 15 designates an atmospheric pressure lead passage, and 16 designates a control-negative pressure generator for controlling the opening of the EGR control valve 12, respectively. The recirculated exhaust gas quantity control apparatus of the present invention generates a certain negative pressure by applying the engine-boost pressure present in the boost lead passage 9 and the atmospheric pressure present in the atmospheric pressure lead passage 15, while it also generates a predetermined control negative pressure by adjusting the above negative pressure in response to the signal output from the EGR control circuit 19.

Note that the constitution described above is identical to that of the prior art shown in FIG. 1.

See FIG. 2, reference numeral 17 designates a port to the air inlet manifold 2. Exhaust gas recirculated from the exhaust gas outlet manifold 3 via the EGR passage 11 is led to air inlet manifold 2 via the port 17 of the EGR passage 11. 18 designates an oxygen sensor which is secured to the air inlet manifold 2 and which detects concentration of oxygen present in fresh air being delivered to the engine 1. The oxygen sensor 18 is secured to the air inlet manifold 2 at a position between the port 17 of the EGR passage 11 leading to the air inlet manifold 2 and the engine 1. Like the solid electrolytic oxygen pump system oxygen sensor disclosed in the Japanese Patent Laid-Open No. 58-153155 (1983) for example, the oxygen sensor 18 generates an output signal in proportion to the detected oxygen concentration. In addition, the recirculated exhaust gas quantity control apparatus of the present invention incorporates the EGR control circuit 19 which generates an output signal corresponding to the driving condition in response to two kinds of signals representing the engine drive condition, i.e., an output signal indicating the number of the revolutions of the engine 1 and another signal indicating the engine boost condition outputted from the engine boost detector 10. The recirculated exhaust gas quantity control apparatus also incorporates an abnormal-condition detecting means 190 inside of the EGR control circuit 19 for judging whether the recirculated exhaust gas quantity is optimum or not, by applying the signal outputted from the oxygen sensor 18.

An alarm generating means 20 is comprised of an alarm display lamp which is driven by signals from abnormal-condition detecting means 190 of the EGR control circuit 19 to warn the car driver of the abnormal condition present in the recirculated exhaust gas quantity control apparatus.

Like the constituent of the prior art shown in FIG. 2, the valve opening detector 13 detects either the displaced amount or the rotation angle of the valve stem of the EGR control valve 12.

The recirculated exhaust gas quantity control apparatus of the present invention executes those functional operations described below.

Fresh air sucked through the air cleaner 7 and the throttle 5 is delivered in mixture together with fuel from the fuel supply device 4 to the engine 1 for combustion. Exhaust gas generated by the combustion inside of engine chambers is then discharged through the exhaust gas outlet manifold 3, while part of exhaust gas is recirculated to the air inlet manifold 2 side via the EGR passage 11, which is then mixed together with the sucked fresh air before being delivered to the engine 1 for combustion again.

Figure 4:
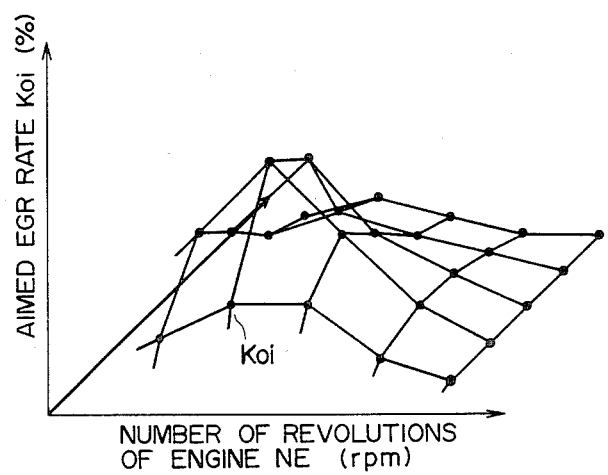
FIG. 4 is the graphical chart showing the aimed value Ko of the exhaust gas recirculating rate.

As soon as the engine 1 is operative, the engine revolution detector 8 and the engine boost detector 10 respectively detects number of revolutions NE of the engine 1 and the engine boost PB which respectively indicate the operative condition of the engine 1, and then these data signals are delivered to the EGR control circuit 19. Then, as shown in FIG. 4, the EGR control circuit 19 selects the aimed EGR rate Koi stored in memory in correspondence with the detected number of the revolutions NE of the engine 1 and the engine boost PB, and then it computes the aimed opening of the EGR control valve 12 by referring to the aimed EGR rate Koi. On the other hand, data related to the opening of the EGR control valve 12 detected by the valve opening detector 13 is already received by the EGR control circuit 19, and as a result, the EGR control circuit 19 generates and outputs signal in order that the comparative deviation of the opening actually measured by the valve opening detector 13 from the aimed opening value can be reduced to zero. On receipt of this signal, the control-negative pressure generator 16 generates a predetermined control negative pressure by applying pressure present in the boost lead passage 9 and the atmospheric pressure lead passage 15 in order that the opening of the EGR control valve 12 can exactly be held at the aimed opening.

Note that, like the prior art mentioned earlier, the present invention uses means for controlling the EGR rate by feeding it back to the aimed EGR rate.

Now, after being delivered to the air inlet manifold 2 from the port 17 via the EGR passage 11 by opening and closing operations of the EGR control valve 12, recirculated exhaust gas is then mixed together with fresh air flowing through the air inlet manifold 2. Oxygen concentration C present in fresh air sucked by the air inlet manifold 2 located in the position down stream side of the port 17 lowers itself as the recirculated exhaust gas quantity increases, i.e., the more the EGR rate, the less the oxygen concentration C in the sucked fresh air. The oxygen sensor 18 detects the oxygen concentration C present in the sucked fresh air, which then generates an output signal IPi exactly matching the actually-measured oxygen concentration Ci as shown in FIG. 3 (a) for delivery to the EGR control circuit 19.

Figure 3:
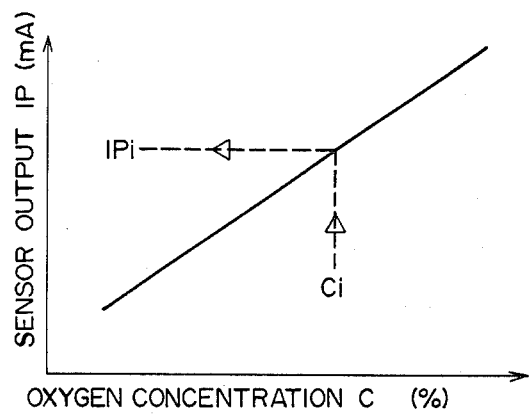
FIGS. 3 (a) and (b) are respectively the graphical charts showing the relationship between oxygen concentration C present in fresh air delivered to an internal combustion engine against signal IP outputted from oxygen sensor and exhaust gas recirculating rate K.
Figure 3:
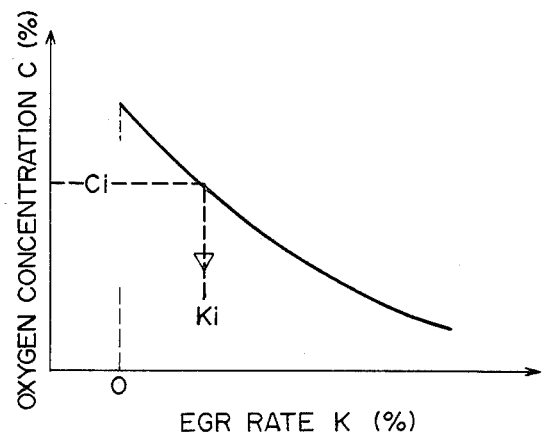
Figure 5:
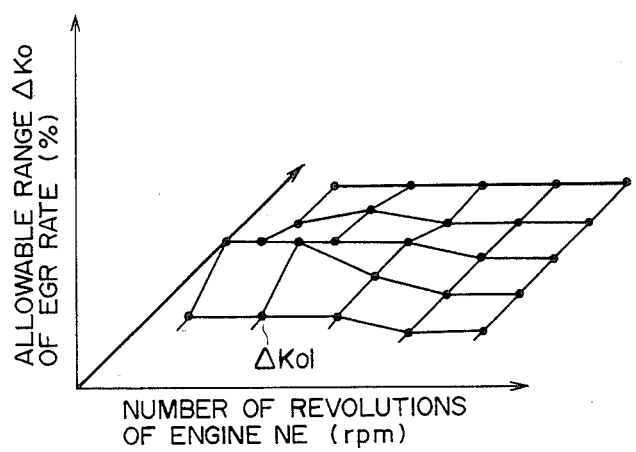
FIG. 5 is the graphical chart showing allowable range ΔKo of exhaust gas recirculating rate.

Using the corrected curve showing the relationship between the sensor output IP and the EGR rate K determined by FIGS. 3 (a) and (b) preliminarily stored in a memory, the EGR control circuit 19 computes the EGR rate Ki actually measured during respective driving conditions while aforesaid feedback operation was underway and also computes the deviation of the actually measured EGR rate Ki from the aimed EGR rate Koi. The EGR control circuit 19 selects the EGR rate allowable range $\Delta Koi$ covering identical driving conditions from the EGR rate allowable range $\Delta Ko$ (shown in FIG. 5) stored in its memory, and then it compares the deviated value between the actually-measured EGR rate Ki and the aimed EGR rate Koi.

When a predetermined condition $|Ki-Koi| > \Delta Koi$ is satisfied, the EGR control circuit 19 causes abnormal-condition detection means 190 to generate an output signal for driving alarm generating means 20 which then generates alarm. Concretely, when either degradation or failure takes place with the EGR control apparatus by clogging or wear of the EGR control valve 12 to cause the actual EGR rate against the identical opening of the EGR control valve 12 to deviated from the aimed EGR rate, alarm is generated, thus allowing the car driver to easily judge the abnoraml condition of the EGR control apparatus to facilitate an early repair work to be done such as replacement of faulty EGR control valve 12 for example.

Figure 6:
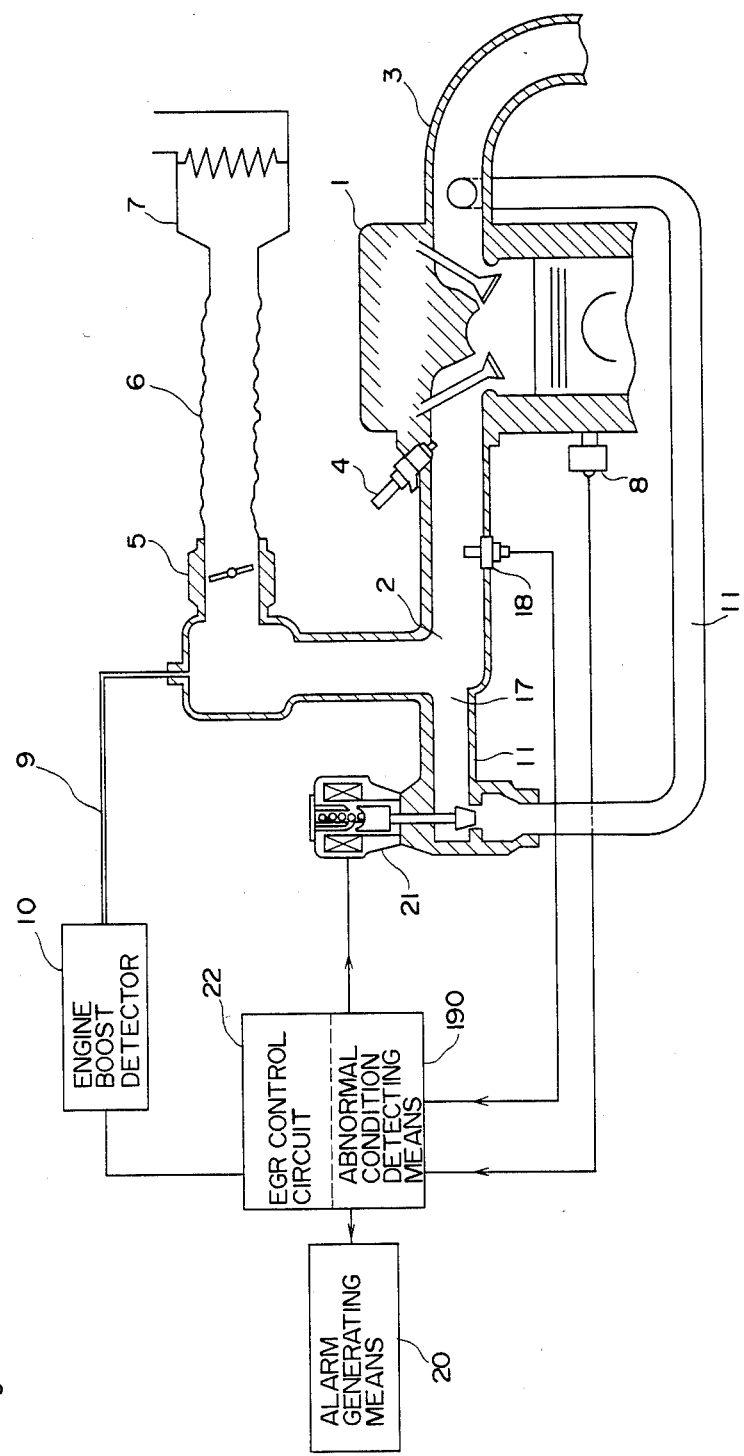
FIG. 6 is the schematic diagram showing another preferred embodiment of the present invention.

FIG. 6 is the schematic diagram showing another preferred embodiment of the recirculated exhaust gas quantity control apparatus of the present invention.

Proportional electromagnetic valve 21 capable of varying its opening proportionally to the control signal is provided in order that it can replace function of the EGR control valve 12 employed for the first preferred embodiment described above, while the operation of this substitutive valve is controlled by the EGR control circuit 22. This system allows the EGR control circuit 22 to directly compute the opening of the EGR control valve 21 using its control signals, and thus, the EGR control valve 21 dispenses with the valve opening detector. Furthermore, the number of signals to be inputted to the EGR control circuit 22 can be reduced, thus advantageously simplifying the entire constitution of the recirculated exhaust gas quantity control apparatus of the present invention.

Needless to say that not only the proportional electromagnetic valve 21 mentioned above, but any of electromagnetic valves may also be used for making up the EGR control valve 21.

The above preferred embodiments respectively introduce means for detecting the number of the revolutions of the engine and engine boost as means for detecting the engine operative condition for delivery to the EGR control circuits 19 and 22. The present invention also allows such a constitution in which recirculated exhaust gas quantity can be controlled by detecting the number of the revolutions of the engine and the throttle valve opening or the sucked fresh air flow rate.

As is expressed clearly from the foregoing description, the preferred embodiments of the present invention is provided with oxygen sensor at the down stream side of the port of the EGR passage in the air inlet manifold, and generates alarm when the signal from the oxygen sensor deviates from allowable output range corresponding to the engine operative condition, thereby providing an advantageous effect for quickly warning the car driver of abnormal condition such as degradation or failure present in the exhaust gas recirculating apparatus.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A recirculated exhaust gas quantity control apparatus for an internal combustion engine comprising:
   a recirculating passage which connects an exhaust gas passage and an air intake passage of said internal combustion engine and recirculates the exhaust gas of said internal combustion engine to said air intake passage;
   a control valve which is installed at an intermediate location of said recirculating passage and controls the recirculated quantity of the exhaust gas;
   at least two engine condition sensors for sensing the operating condition of said internal combustion engine, one of said sensors sensing the number of revolutions of said internal combustion engine and the other said sensor sensing one of the negative pressure, the throttle valve opening, and the intake air quantity of the internal combustion engine;
   a control circuit for adjusting the opening of said control valve by computing an optimum recirculated quantity of the exhaust gas based on the signals from said at least two engine-condition sensors;
   an oxygen sensor for sensing oxygen concentration inside of said air intake passage at the down stream side of the connecting location of said recirculating passage thereto;

detector means for detecting opening of said control valve;

an opening control means for controlling the opening of the control valve to make the deviation zero between the actual recirculated quantity of the exhaust gas based on the actual opening of said control valve and the optimum recirculated quantity of the exhaust gas computed based on said at least two engine-condition sensors;

an abnormal-condition detecting means for judging the occurrence of an abnormal condition when the difference between the recirculated quantity of the exhaust gas computed based on the detected signal of said oxygen sensor and the recirculated quantity of the exhaust gas computed based on one of the signals of said at least two engine-condition sensors exceeds a predetermined valve; and alarm generating means for generating an alarm when said abnormal-condition detecting means detects said abnormal condition.

2. A recirculated exhaust gas quantity control apparatus for an internal combustion engine as set forth in claim 1, in which said control valve is a proportional electromagnetic valve.

* * * * *